(12) United States Patent
Schuur

(10) Patent No.: US 9,540,782 B2
(45) Date of Patent: Jan. 10, 2017

(54) APPARATUS AND METHOD FOR COLLECTING A FLOATABLE LIQUID

(71) Applicant: Environment Solutions B.V., Amsterdam (NL)

(72) Inventor: Willem Joseph Clemens Schuur, Oosterhout (NL)

(73) Assignee: Environment Solutions B.V., Amsterdam (NL)

( * ) Notice: Subject to any disclaimer, the term of this patent is extended or adjusted under 35 U.S.C. 154(b) by 198 days.

(21) Appl. No.: 14/373,530

(22) PCT Filed: Jan. 23, 2013

(86) PCT No.: PCT/NL2013/050034
§ 371 (c)(1),
(2) Date: Jul. 21, 2014

(87) PCT Pub. No.: WO2013/112047
PCT Pub. Date: Aug. 1, 2013

(65) Prior Publication Data
US 2014/0360949 A1 Dec. 11, 2014

(30) Foreign Application Priority Data

Jan. 23, 2012 (NL) .................................... 2008164

(51) Int. Cl.
| | |
|---|---|
| *E02B 15/04* | (2006.01) |
| *B01D 17/02* | (2006.01) |
| *E02B 15/10* | (2006.01) |
| *C02F 1/40* | (2006.01) |
| *C02F 101/32* | (2006.01) |
| *C02F 103/00* | (2006.01) |
| *C02F 103/08* | (2006.01) |

(52) U.S. Cl.
CPC ......... *E02B 15/045* (2013.01); *B01D 17/0208* (2013.01); *B01D 17/0214* (2013.01); *E02B 15/106* (2013.01); *C02F 1/40* (2013.01); *C02F 2101/32* (2013.01); *C02F 2103/007* (2013.01); *C02F 2103/08* (2013.01); *C02F 2201/009* (2013.01)

(58) Field of Classification Search
CPC .. E02B 15/045; E02B 15/106; B01D 17/0214; Y10S 210/923
USPC .............. 210/170.05, 170.09, 170.11, 242.1, 210/242.3, 923, 747.6, 776
See application file for complete search history.

(56) References Cited

U.S. PATENT DOCUMENTS

| | | | |
|---|---|---|---|
| 3,665,713 A | 5/1972 | Rath | |
| 3,745,115 A * | 7/1973 | Olsen | .................... E02B 15/106 210/242.3 |
| 4,024,063 A | 5/1977 | Mori | |
| (Continued) | | | |

FOREIGN PATENT DOCUMENTS

DE 19854317 A1 5/2000

*Primary Examiner* — Christopher Upton
(74) *Attorney, Agent, or Firm* — The Webb Law Firm

(57) ABSTRACT

The invention relates to an apparatus for collecting a lighter fraction floatable liquid from a heavier fraction liquid, such as a lighter fraction floating oil from a heavier fraction water, the apparatus comprising: a floatable collecting container and a cover placed above the collecting container leaving a continuous passage slot free; wherein the opening of the passage slot is adjustable by an inlet adjustment ring. The invention also provides a method to operate such an apparatus.

15 Claims, 3 Drawing Sheets

(56) References Cited

U.S. PATENT DOCUMENTS

| | | | |
|---|---|---|---|
| 4,182,679 A * | 1/1980 | Van Hekle | E02B 15/048 210/242.3 |
| 4,695,376 A * | 9/1987 | Astrom | B01D 17/0214 210/242.1 |
| 5,118,412 A * | 6/1992 | Schmidt | E02B 15/106 210/242.3 |
| 5,713,697 A | 2/1998 | Steiner | |
| 6,015,501 A * | 1/2000 | Lundback | E02B 15/106 210/242.3 |
| 6,274,046 B1 * | 8/2001 | Lundback | E02B 15/106 210/242.3 |
| 6,743,358 B1 * | 6/2004 | Lundback | E02B 15/106 210/242.3 |

\* cited by examiner

APPARATUS AND METHOD FOR COLLECTING A FLOATABLE LIQUID

CROSS-REFERENCE TO RELATED APPLICATIONS

This application is the United States national phase of International Application No. PCT/NL2013/050034 filed Jan. 23, 2013, and claims priority to Netherlands Patent Application No. 2008164 filed Jan. 23, 2012, the disclosures of which are hereby incorporated in their entirety by reference.

BACKGROUND OF THE INVENTION

Field of the Invention

The present invention relates to an apparatus for collecting a lighter fraction floatable liquid from a heavier fraction liquid, such as a lighter fraction floating oil from a heavier fraction water. The invention also relates to a method for collecting a lighter fraction floatable liquid from a heavier fraction liquid making use of such an apparatus.

Description of Related Art

Removal of a layer of pollutant floating on a liquid is an actual problem that has worldwide attention. Reference is made to several more or less accidents that took place during recent years as a result of, for instance, oil and gas recovery, transportation of oil and other fluid products, and storage of polluting liquids. The most striking example is the disaster that started in April 2010 in the Gulf of Mexico as a result of a malfunctioning blowout preventer system. Millions of liters of oil were spilled and only a few percent of the spilled oil was recovered. Vessels with cleaning arms where not able to collect a serious amount of the spilled oil so the decision was made to use chemicals for dissolving the oil in the seawater. This was not only bad for environmental reasons it is also economically undesired.

In the prior art also a mechanical type of oil extraction station is known from U.S. Pat. No. 5,713,697 that provides a vat-like collecting container to be immersed into water that is partly borne on an annular float. Below the float and connected to the collecting container is a parabolic intake trough that leaves in between the float and the intake trough an inlet opening for the oil and gasoline floating on the water. The dimension S of the inlet opening between the float and the intake trough is variable by relative movement of the float and the intake trough. The type of apparatus as disclosed in this patent provides not the required functionality of effective oil extraction in variable circumstances and is not the answer to effective cleaning of oil spillage in practise.

The intention of the present invention is to provide more effective and efficient equipment and working methods than the prior art provides for collecting a lighter fraction floatable liquid from a heavier fraction liquid under variable circumstances, such as a lighter fraction floating oil from a heavier fraction water.

SUMMARY OF THE INVENTION

The present invention provides for this purpose an apparatus for collecting a lighter fraction floatable liquid from a heavier fraction liquid, such as a lighter fraction floating oil from a heavier fraction water, the apparatus comprising: a floatable collecting container with an open top, a first discharge for removal of the lighter fraction collected liquid from the collecting container connecting to the container at a distance of the open top, and a second discharge for removal of collected heavier fraction liquid connecting to the container at a larger distance of the open top than the first discharge; a cover placed above the collecting container such that a continuous passage slot results between the collecting container and the cover; and at least one pump placed in the collecting container for removal of liquid from the collecting container thought at least one of the discharges; wherein the floatable collecting container and the cover are fixed connect to each other with a passage slot with a continuous dimension, and that the apparatus also comprises an inlet adjustment ring that is moveable connected to the floatable collecting container and the cover such that is displaceable between a closing position wherein the inlet adjustment ring at least substantially closes the continuous passage slot between the collecting container and the cover and an open position wherein the inlet adjustment ring at least substantially leaves the continuous passage slot between the collecting container and the cover open. An important advantage of the present invention is that the inlet adjustment ring enables to vary the inflow conditions for the lighter liquid fraction and thus provides the facility of guidance of the liquid flow entering the collecting container and thus enables regulation of the collection process. Such enhanced guidance and regulation facility enables to adjust the working conditions of the apparatus according the invention dependent on the actual conditions of use. When the inlet adjustment ring is in a higher position the continuous passage slot in a preferred embodiment is fully opened while by lowering the inlet adjustment ring the continuous passage slot can partially closed off from the underside so the liquid entering the collecting container will be guided by the adjustment ring in such situation with a partially closes off passage slot. Dependant from the resultant of environmental conditions like wind and flow and the position of the apparatus according the invention will the liquid to be collected enter along a part of the circumference of the inlet gap. An operator handling the collecting apparatus can change the vertical position of the adjustment ring. The operator can also take into account other situational conditions like the relative density and the viscosity (which can also be dependent on emulsion formation) of the liquid fractions to be processed. Environmental conditions do not only influence the viscosity of the liquids top be processed but another relevant process condition is the inflow effect at the location of entrance of the collecting container.

The floatable collecting container may be provided with additional buoyancy means to further control the conditions of collecting the lighter liquid fraction. For instance when a thick oil layer is floating on a (sea)water surface the inlet adjustment ring may be placed in a higher position enabling a thicker liquid layer (oil) to flow in the floatable collecting container, while when in contrast a thin oil layer is floating on a (sea)water surface the inlet adjustment ring may be placed in a lower position enabling a only a thin liquid layer (oil) to flow in the floatable collecting container. By regulation of the position of the inlet adjustment ring thus the collecting process (and the collected mixture characteristics) are controlled and can be optimised.

In an embodiment the inlet adjustment ring is provided with nozzles. These nozzles are to be connected to a feed system, e.g. a liquid feed or a gas feed, to blow a fluid out of the nozzles. When blowing out a liquid the nozzles may clean the continuous passage slot between the collecting container and the cover when is partially or completely blocked by pollutants/contaminants that may be present in the liquid wherein the apparatus is partially immersed. E.g.

debris like wood, plastic articles, animal cadavers, (polystyrene) foam fragments that may also float on/in the lighter fraction liquid floating on the heavier fraction liquid. The movability of the inlet adjustment ring has the additional advantage that the nozzles can thus me moved along with the movement of the inlet adjustment ring results in the enhanced cleaning effect of the moving blowing nozzles. Also the vertical movability of the nozzles on the inlet adjustment ring enables the cleaning of the inlet gap in vertical direction. When collecting the lighter liquid fraction a current towards the continuous passage slot results that may carry along such floating object objects unlit they reach the continuous passage slot any as a result may (partially) block the continuous passage slot. Also more viscous liquid fractions may block the continuous passage slot. As for an efficient use of the apparatus according the invention the continuous passage slot is better not to be blocked on an uncontrolled way by material the nozzles on the inlet adjustment ring are useful in blow off such material. For this reason it is preferred that the nozzles of the inlet adjustment ring are directed outwards of the continuous passage slot between the collecting container and the cover.

For moving the inlet adjustment ring relative to the floatable collecting container and the cover the apparatus may be provided with a drive for movement. Such drive can effectively be of the type of a hydraulic or pneumatic cylinder and/or any other hydraulic or pneumatic rotary actuator. Furthermore the inlet adjustment ring may be hollow as to provide some additional buoyancy to the apparatus according the invention but also to allow any medium like liquid or gas to the nozzles that can be integrated in the inlet adjustment ring.

A further improvement on the apparatus may be provided by at least one of the discharges being flexible connected to the collecting container. Such connection may be realised via for instance a nylon or polyester hose or tube that preferably is connected below water level to the floatable collecting container. Such discharge is not disturbing the inflow of the lighter liquid fraction (as it is below such fraction close to the apparatus) and thus the discharge of any fraction from the apparatus may be realised without disturbing the critical inflow process.

The pump to feed out the apparatus at least one of the collected fraction may be placed in the collecting container for removal of liquid from the collecting container thought at least one of the discharges is a hydraulic impeller pump. For at least providing partially in the energy demand of the collecting apparatus the cover may be provided with at least one, but preferably more, PV solar cells.

A further specification of the floatable collecting container may be to provide it with a safety valve. Such safety valve can be located at the lower part of the collecting container so to provide an option of outflow in case the collecting apparatus is overloaded. In a further specification the collecting container may be substantially rotation symmetrical.

Yet in a next embodiment the apparatus may also be provided with an additional closing element segment for at least partial closure of the continuous passage slot over a part of the length of the passage slot. Such segment may be in the shape of a segment of a circle, for instance a circle segment of 100-180°, 120-160°, or more specific approximately 140°. For instance when waves are disturbing the process and/or when the apparatus is dragged through a liquid on one side of the apparatus the process of controlled inflow may be disturbed. In such situation the disturbance can be overcome by closing off the disturbed segment of the continuous passage slot. As an example it is possible while towing the collecting apparatus according the present invention with a tugboat to close off a part of the passage slot (e.g. a part over 140°) that is turned away from the tugboat so to prevent the undesirable inflow of water in the collecting container.

The invention also provides a method for collecting a lighter fraction floatable liquid from a heavier fraction liquid, such as a lighter fraction floating oil from a heavier fraction water, the method comprising the process steps of: A) placing an apparatus according the invention as disclosed above in the heavier fraction liquid, B) moving the inlet adjustment ring relative to the floatable collecting container and the cover to a position wherein the height of the adjustment ring is adjusted to the level of lighter fraction floatable liquid, and C) removing the lighter fraction from the apparatus to a lighter fraction storage by pumping it out of the apparatus and removing the heavier fraction liquid from the apparatus by returning it to the outside of the apparatus. With such method the advantages as already listed above in relation to the apparatus according the present invention may be realised. Adjustment of the height of the adjustment ring relative to the floatable collecting container is such that dependent on the conditions a required specification of the collecting properties of the floatable liquid fraction can be realised. E.g. the relative density (that also relates with the temperature) of the heavier fraction liquid, weather conditions, pump capacity, required mixture specification of the mixture collected in the collecting container may be compensated by the adjustment of the position of the inlet adjustment ring. As also already explained the nozzles on the inlet adjustment ring may be used to blow away contamination from the continuous passage slot. A further improvement of the blowing away contamination from the continuous passage slot can be obtained when during blowing away contamination from the continuous passage slot the inlet adjustment ring is moved.

BRIEF DESCRIPTION OF THE DRAWINGS

The invention will be further elucidated herein below on the basis of the non-limitative exemplary embodiments shown in the following figures. Herein shows.

DESCRIPTION OF THE INVENTION

Figure 1A:
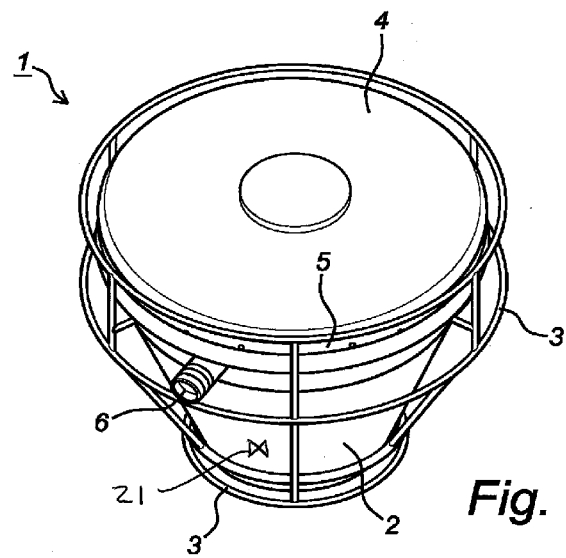
FIG. 1A a perspective top view of an embodiment of the apparatus according the present invention.
Figure 1B:
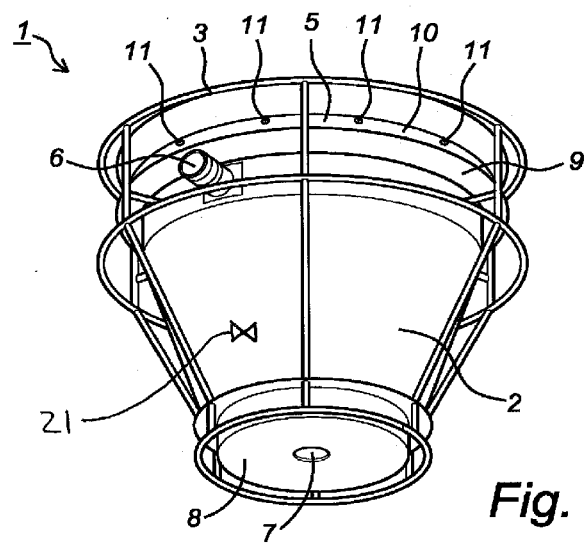
FIG. 1B a perspective bottom view of the embodiment of the apparatus as shown in FIG. 1A, FIG. 2 a cut-away side view of the embodiment of the apparatus as shown in FIGS. 1A and 1B, and FIGS. 3A-3C show various cross-sections through a part of the an apparatus according the present invention, wherein the position of the inlet adjustment ring is varied.

Referring again to FIG. 1A and to FIG. 1B, a safety valve 21 can be located at the lower part of the collecting container 2 so as to provide an option of outflow in case the collecting apparatus 1 is overloaded.

FIG. 1A shows a collecting apparatus 1 according the present invention (also referred to as floating oil recovery or "FORU") with a conical collecting container 2 (for instance a vessel to be submerged) that is protected against damage by a metal screen 3 that surrounds the collecting container. Also visible is a cover 4 (also non-limitative referred to as a "fix top float") that is placed above the collecting container 2 such that a such that a circular passage slot 5 (better seen in FIG. 1B) results between the container 2 and the cover 4;

the passage slot 5 is to be considered as an inlet gap or inlet opening of the collecting apparatus 1. Also visible is a first discharge 6 for removal of the lighter fraction liquid from the container 2. In the situation of removal of a lighter oil fraction floating on a water level the first discharge 6 can be referred to as "recovered oil discharge connection". The lighter fraction discharge 6 is to be connected with flexible coupling to a reservoir (e.g. a vessel of floating storage tank) for the storage of the collected lighter fraction liquid. This connection (as well as other connections) can in a specific embodiment be provided as high pressure hydraulic hose connection that may be provided with an external hydraulic power pack.

The same collecting apparatus 1 is also shown in FIG. 1B; here a second discharge 7 for removal of collected heavier fraction liquid (in case of oil collection floating on water the water fraction) is shown that is connecting to the bottom 8 of the container 2. The topside of the container 2 is provided with a thicker edge 9 over which the liquid to be collected flows into the container 2. The thicker edge 9 may not only provide a smooth flow of liquid in the container 2 but may also provided buoyancy to the container 2. Partly seen behind the thicker edge 9 is an inlet adjustment ring 10 (as also is non-limitative referred to as "inlet gap adjustment ring") which may be raised and lowered dependent on the required level of aperture of the circular passage slot 5. On the inlet adjustment ring 10 nozzles 11 are housed that may clean the circular passage slot 5 when being obstructed.

Figure 2:
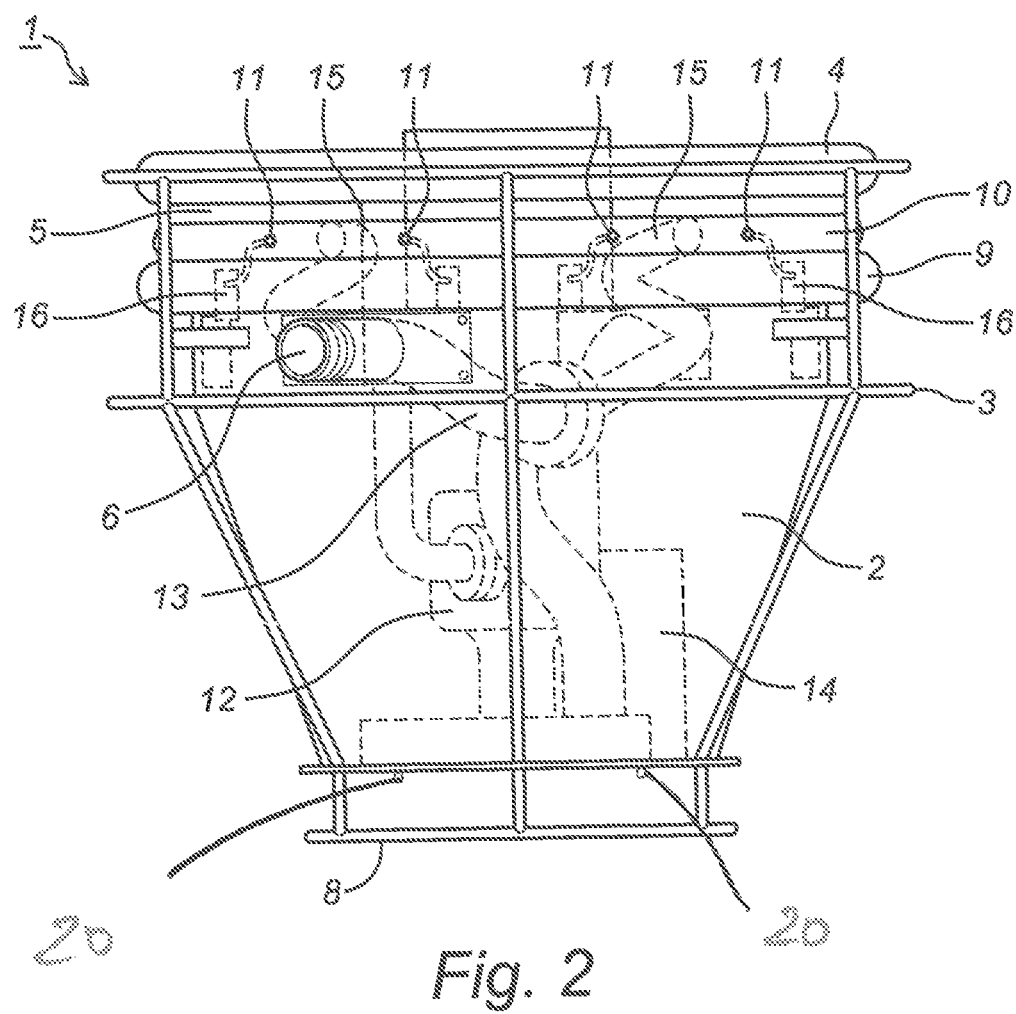

In the FIG. 2 cut-away side view of the apparatus 1 is shown. Now also a pump 12, for instance a hydraulic driven (main) pump, with connecting hosing 13 is visible that is places inside the collecting container 2. As only schematically depicted also a control unit 14 ("instrument box") may be placed inside the collecting container 2. For feeding liquid to the spraying nozzles 11 the pump 12 also via additional tubes 15 to these nozzles 11. As for the (in this figure vertical) movement of the inlet adjustment ring 10 driving cylinders 16 (for instance hydraulic valve actuators) are located on the inside of the collecting container 2 that are connected to the inlet adjustment ring 10. As an alternative for the driving cylinders 16 hydraulic rotary actuators provide an advantageous choice. In this figure also two additional holes are 20 are shown that enable venting of the apparatus 1. The advantage of the holes 20 is that these holes 20 enable the venting in a central space to be (partially) filled with liquid (water) so to enhance the stability of the position of the apparatus 1 in the liquid. Among others so the swinging quality of the apparatus 1 in the liquid (water) can be influenced.

Figure 3A:
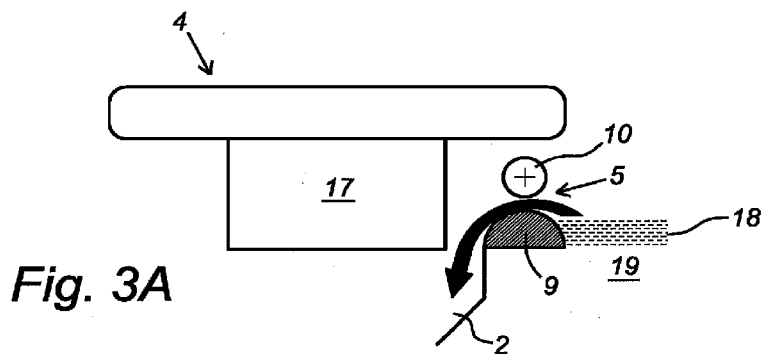
Figure 3B:
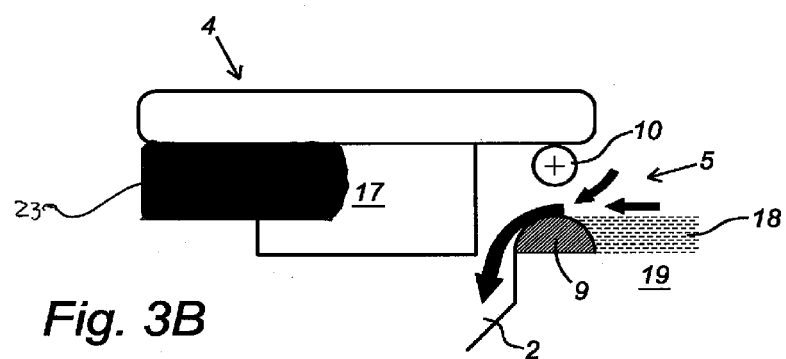
Figure 3C:
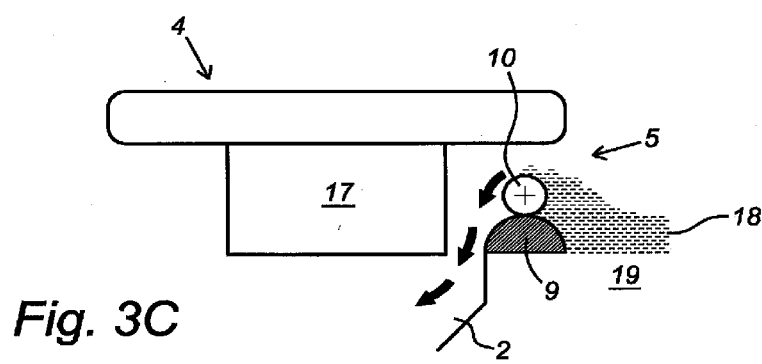

FIGS. 3A-3C show various cross-sections through a part of the cover 4, circular passage slot 5, edge 9 of the collecting container 2 and inlet adjustment ring 10 wherein the position of the inlet adjustment ring 10 is in the different figures is varied relative to the edge 9 of the collecting container 2. The cover 4 is at a central position provided with a balance chamber 17 that provides the collecting apparatus 1 additional stability when floating in a fluid. Dependant on various conditions as among others the level of lighter liquid fraction 18 (e.g. oil during cleaning of oil spillage with the collecting apparatus 1) floating on the heavier fraction liquid 19 (e.g. water during cleaning of oil spillage) the position the inlet adjustment ring 10 relative to the edge 9 may be differentiated. In FIG. 3A the inlet adjustment ring 10 is located in an intermediate position wherein the lighter liquid fraction 18 flows over the edge 9 into the collecting container 2. To enable such flow liquid has to be removed from the collecting container 2. For this reason in the collecting container 2 at least one pump (not shown in this figure) is provided that may pump the heavier fraction liquid and/or the lighter fraction from the collecting container 2. In case only a single pump is used one or more liquid sensors may be provided that steer valves to pump lighter and/or heavier fraction liquid from the collecting container 2 dependent on the content of heavier and lighter fraction liquid in the collecting container 2. For steering these valves and for steering the cover all liquid level in the collecting container a operating system may be part of the a control unit 14. In FIG. 3B the inlet adjustment ring 10 is located in an higher position wherein a larger flow rate (compared to FIG. 3A) of the lighter liquid fraction 18 flows over the edge 9 into the collecting container 2. For instance in situation where the layer of floating lighter liquid 18 is thicker (see the thicker layer in FIG. 3B when compared to FIG. 3A) the capacity of recovery of lighter liquid fraction can be enhanced.

Referring again to FIG. 3B, the collecting apparatus 1 may also be provided with an additional closing element 23 segment for at least partial closure of the continuous passage slot 5. Such segment may be in the shape of a segment of a circle, for instance a circle segment of 100-180°, 120-160°, or more specifically approximately 140°. For instance when waves are disturbing the process and/or when the collecting apparatus 1 is dragged through a liquid on one side of the apparatus 1, the process of controlled inflow may be disturbed. In such situation, the disturbance can be overcome by closing off the disturbed segment of the continuous passage slot 5. As an example it is possible while towing the collecting apparatus 1 according to the present invention with a tugboat to close off a part of the continuous passage slot 5, e.g., a part over 140°, that is turned away from the tugboat so as to prevent the undesirable inflow of water in the collecting container 2.

For situations when the inflow of lighter liquid fraction is to be limited (e.g. when towing the collecting apparatus 1) the inlet adjustment ring 10 is located in a lower position (FIG. 3C) wherein the inlet adjustment ring 10 contacts the edge 9. In such a position the inlet adjustment ring 10 substantially prevents the inflow of the lighter liquid fraction 18 into the collecting container 2 as illustrated. As an additional feature the collecting container 2 may also be provided with a inlet valve that is preferably located in the bottom of the collecting container 2 that may provide a quick filling of the container 2 with heavier liquid fraction from the bottom in situation wherein the level of filling of the container 2 is to low (e.g. when placing the unit unfilled in the liquid).

The invention claimed is:

1. An apparatus for collecting a lighter fraction floatable liquid from a heavier fraction liquid, such as a lighter fraction floating oil from a heavier fraction water, the apparatus comprising:

a floatable collecting container with an open top, a first discharge for removal of the lighter fraction collected liquid from the collecting container connecting to the container at a distance of the open top, and a second discharge for removal of collected heavier fraction liquid connecting to the container at a larger distance of the open top than the first discharge;

at least one pump placed in the collecting container for removal of liquid from the collecting container through at least one of the discharges, wherein the floatable collecting container is provided with an open top and a cover is fixedly connected above the collecting container such that a passage slot with a continuous dimension results between the collecting container and the cover, and that the apparatus also comprises an inlet adjustment ring that is movably connected to the floatable collecting container and the cover, such that the inlet adjustment ring is displaceable between a closing position wherein the inlet adjustment ring at least substantially closes the continuous passage slot between the collecting container and the cover and an open position wherein the inlet adjustment ring at least substantially leaves the continuous passage slot between the collecting container and the cover open.

2. The apparatus as claimed in claim 1, wherein the inlet adjustment ring provided with nozzles.

3. The apparatus as claimed in claim 2, wherein the nozzles of the inlet adjustment ring are directed outwards of the continuous passage slot between the collecting container and the cover.

4. The apparatus as claimed in claim 1, wherein the apparatus is also provided with a drive for movement of the inlet adjustment ring relative to the floatable collecting container and the cover.

5. The apparatus as claimed in claim 1, wherein the inlet adjustment ring is hollow.

6. The apparatus as claimed in claim 1, wherein at least one of the discharges is flexible connecting to the collecting container.

7. The apparatus as claimed in claim 1, wherein the pump placed in the collecting container for removal of liquid from the collecting container thought at least one of the discharges is a hydraulic impeller pump.

8. The apparatus as claimed in claim 1, wherein the cover is provided with at least one PV solar cell.

9. The apparatus as claimed in claim 1, wherein the floatable collecting container is provided with a safety valve.

10. The apparatus as claimed in claim 1, wherein the collecting container is substantially rotation symmetrical.

11. The apparatus as claimed in claim 1, wherein the apparatus is also provided with an additional closing element segment for closure of the continuous passage slot over a part of the length of the passage slot.

12. A method for collecting a lighter fraction floatable liquid from a heavier fraction liquid, such as a lighter fraction floating oil from a heavier fraction water, the method comprising the process steps of:
  A) placing an apparatus having an open-topped collecting container, a cover fixedly connected above the collecting container defining a slot with a continuous dimension between the collecting container and the cover, and at least one pump in the container in the heavier fraction liquid,
  B) moving an inlet adjustment ring relative to the collecting container and the cover to a position wherein the height of the adjustment ring is adjusted to the level of lighter fraction floatable liquid, and
  C) removing the lighter fraction from the apparatus to a lighter fraction storage by pumping it out of the apparatus and removing the heavier fraction liquid from the apparatus by returning it to the outside of the apparatus.

13. The method as claimed in claim 12, wherein nozzles on the inlet adjustment ring are used to blow away contamination from the slot.

14. The method as claimed in claim 13, wherein during blowing away contamination from the slot the inlet adjustment ring is moved.

15. The method as claimed in claim 12, wherein when dragging of the apparatus the slot of the apparatus is covered over a part of the length of the slot by moving an additional closing element segment to a closing position.

* * * * *